US000001866H

United States Statutory Invention Registration [19]

[11] Reg. Number: H1,866

Wright

[45] Published: Oct. 3, 2000

[54] SUPPORT SPRING FOR A CRYOCOOLER

[75] Inventor: Dexter V. Wright, Pittsburgh, Pa.

[73] Assignee: United States of America, Washington, D.C.

[21] Appl. No.: 09/288,044

[22] Filed: Apr. 6, 1999

[51] Int. Cl.[7] ..... F25B 9/00

[52] U.S. Cl. ..... 62/6

*Primary Examiner*—Harold J. Tudor
*Attorney, Agent, or Firm*—Thomas E. McDonnell

[57] ABSTRACT

This invention is a support spring made of a material, such as aluminum, that is damped by friction forces to directly support a sapphire dielectric resonator operating from a cold finger at cryogenic temperatures in a spring-mounted enclosure to reduce a phase-noise vibration sensitivity of the sapphire dielectric resonator. The support spring provides vibration isolation in al three directions, along with good thermal conductivity to aid in resonator cool-down. A damper clamp and damper clips provide the friction forces necessary for damping which prevents large vibration transmission peaks in a hostile, low-temperature, high-vacuum environment.

2 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUPPORT SPRING FOR A CRYOCOOLER

BACKGROUND OF THE INVENTION

1. Field of the Invention

This invention pertains generally to a damping support spring for supporting an object and more particularly to a spring arrangement for supporting a cold finger of an open-cycle cryocooler.

2. Description of the Related Art

The development of very low phase noise in cryogenic radars requires the use of sapphire dielectric resonators at X-band frequencies operating at cryogenic temperatures to achieve loaded Q's greater than $3\times10^6$. A phase-noise goal of −145 $dB_c$/Hz at 1 KHz offset, which corresponds to an allowable frequency jitter Δf of $3\times10^{-5}$ Hz, imposes significant vibration sensitivity requirements on the resonator. A dielectric resonator/oscillator including a sapphire puck that is soft-mounted in a metal enclosure operating in a $5^{th}$-order whispering gallery mode wherein the resonator frequency is affected by very small relative axial and radial displacements of the inner surfaces of the enclosure, so that a support spring must provide effective vibration isolation in all three directions to achieve a required low phase-noise goal. The support spring must be damped to avoid excessive vibration transmission at its natural frequencies and it must have high thermal conductivity to conduct heat from the resonator to the cold finger without excessive temperature drop.

Currently resonators are cooled with a liquid nitrogen bath and they are not directly supported from a cold finger with a spring, or supported with a spring from a cold radiation shield which is connected to the cold finger of a closed-cycle cryocooler.

SUMMARY OF THE INVENTION

The object of this invention is to provide a support spring to directly support a sapphire dielectric resonator operating from a cold finger at cryogenic temperatures in a spring-mounted enclosure These and other objectives are accomplished by a support spring made of a material, such as aluminum, that is damped by friction forces to reduce the phase-noise vibration sensitivity of a sapphire dielectric resonator. The support spring provides vibration isolation in all three directions, along with good thermal conductivity to aid in resonator cool-down. A damper clamp and damper clips provide friction damping which prevents large vibration transmission peaks in a hostile, low-temperature, high-vacuum environment.

DESCRIPTION OF THE PREFERRED EMBODIMENT

Figure 1A:
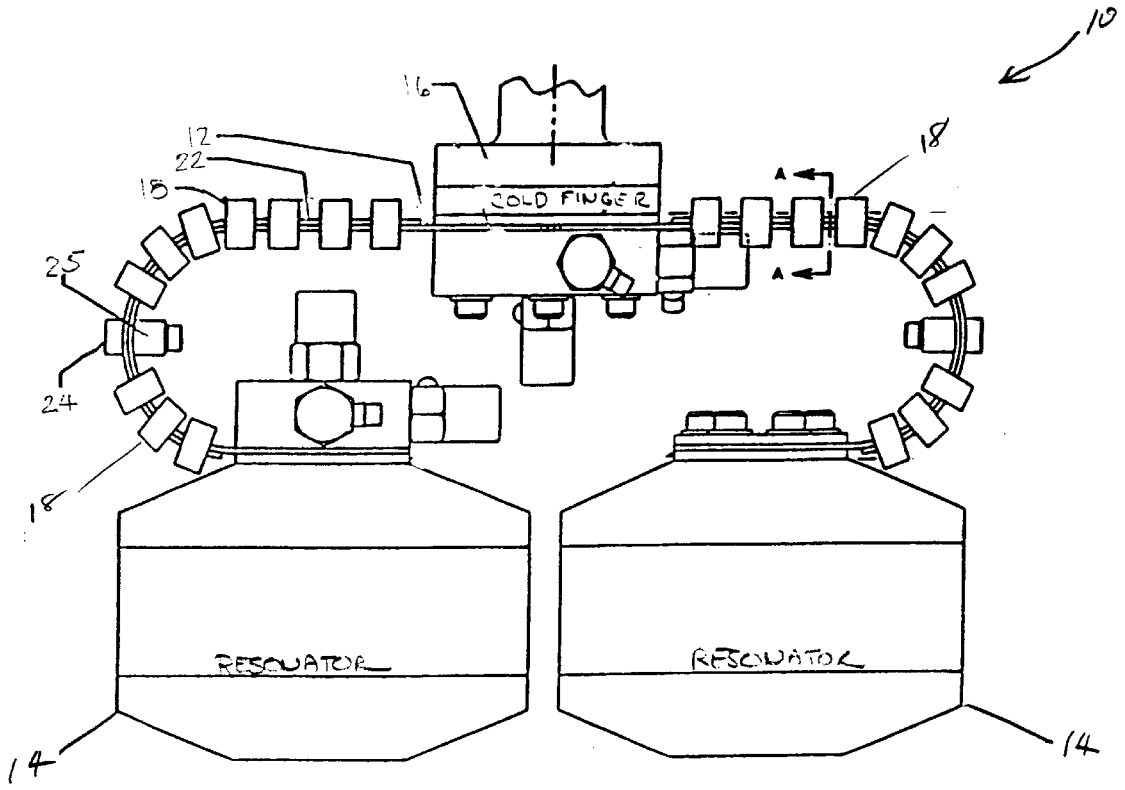
FIG. 1*a* shows a typical support spring installed between a cold finger and a resonator.
Figure 1B:
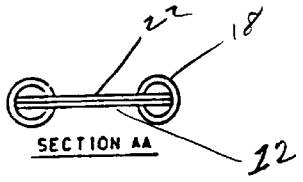
FIG. 1*b* shows a typical cross section of a support spring.
Figure 2A:
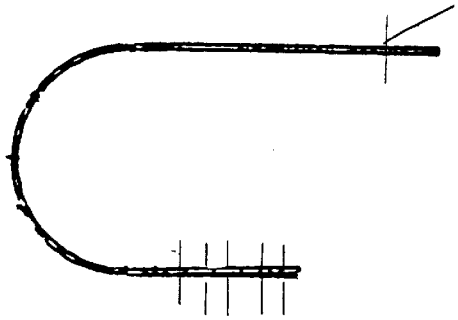
FIG. 2*a* shows a typical cross sectional view of a support spring.
Figure 2B:
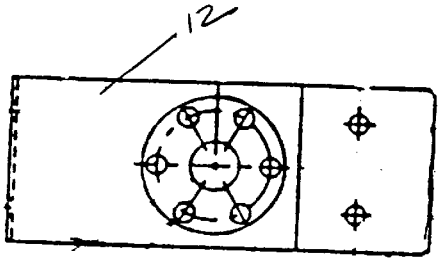
FIG. 2*b* shows a typical plan view of a support spring viewed from the bottom.
Figure 3A:
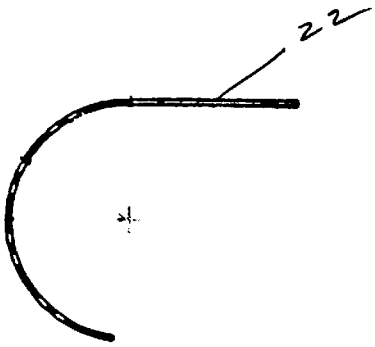
FIG. 3*a* shows a typical cross sectional view of a damper strap.
Figure 3B:
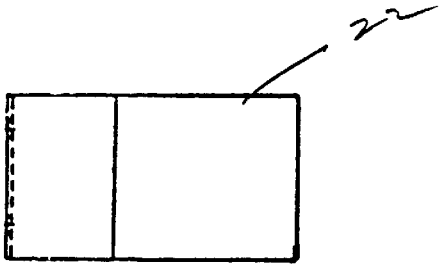
FIG. 3*b* shows a typical plan view of a damper strap viewed from the bottom.

The preferred embodiment of this invention is a support spring 12, as shown in FIG. 1, supporting a pair of resonators 14 from a cold finger 16 of an open-cycle cryocooler 10. To avoid large vibration transmission peaks in the frequency range of interest, the support spring 12 is damped. Since viscoelastic materials are unsuitable for the low-temperature, high vacuum environment in which the spring must operate, the spring is damped with friction forces. Each damper clip 18 pinches the damper strap 22 and the support spring 12 together with a force of about 64 N, and outer and inner clamp bars 24 and 25, respectively, clamp them together at the 90 degree position. As the support spring 12 is deflected, the damper strap 22 slips slightly on the support spring 12, especially near the ends of the damper strap 22, unless the damper clip 18 forces are too large. The damper clip 18 forces are optimized to maximize the friction damping. The support spring 12, as shown in FIGS. 2*a* and 2*b*, and the damper strap 22, as shown in FIGS. 3*a* and 3*b*, are preferably made from aluminum, such as 6061-T6 aluminum sheet 0.048 inches thick and are hard anodized to prevent galling and wear, a technique well known to those skilled in the art. However, any other type metal desired may be used by those skilled in the art.

Figure 4A:
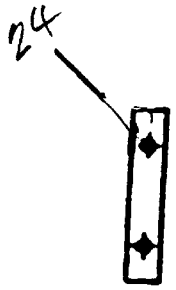
FIG. 4*a* shows a plan view of a typical outer clamp bar.
Figure 4B:
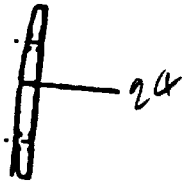
FIG. 4*b* shows a typical cross sectional view along the center axis of an outer clamp bar.
Figure 4C:
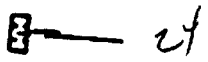
FIG. 4*c* shows a typical cross section through an outer clamp bar.
Figure 5A:
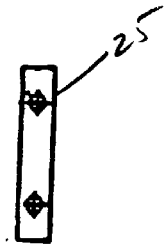
FIG. 5*a* shows a plan view of a typical inner clamp bar.
Figure 5B:
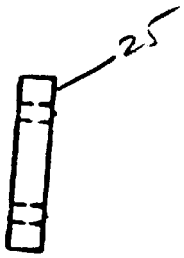
FIG. 5*b* shows a typical cross sectional view along the center axis of a typical inner clamp bar.
Figure 5C:
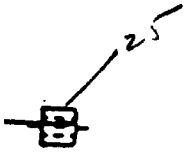
FIG. 5*c* shows a typical cross sectional view through a typical inner clamp bar.
Figure 6A:
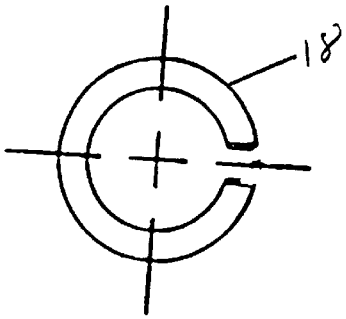
FIG. 6*a* shows a cross sectional view of a typical damper clip.
Figure 6B:
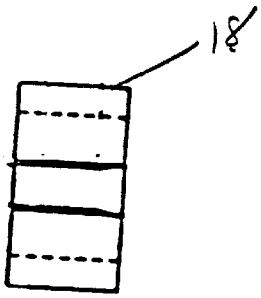
FIG. 6*b* shows a plan view of a typical damper clip.

The outer clamp bar 24, as shown in FIGS. 4*a*, 4*b* and 4*c*, the inner clamp bar 25, as shown in FIGS. 5*a*, 5*b* and 5*c*, are, preferably, made of a 303 stainless steel and secured to the support spring 12 and damper strap 22, preferably, by Allen screws. The damper clip 18, as shown in FIGS. 6*a* and 6*b*, is made, preferably of 2024-T3 or 6061-T61 aluminum tubing. In all instances these are only suggested materials and the aforementioned components may be made of any material the artisan skilled in the art may determine to fit the installation best.

Figure 7:
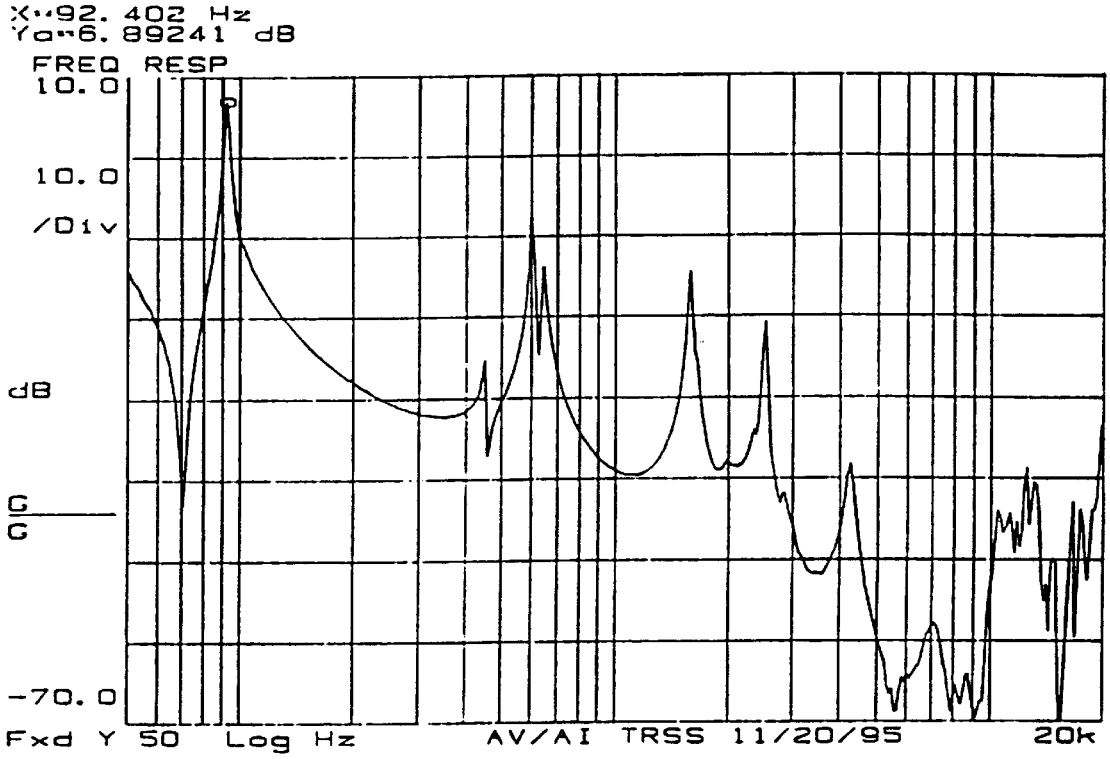
FIG. 7 shows a plot of measured acceleration ratios of a support spring as shown in FIG. 1.

The vertical vibration isolation, $A_{2v}/A_{1v}$, of the support spring 12, is shown in FIG. 7. The vibration transmission peaks at 92 Hz, 1583 Hz, and 2514 Hz are significant, but very much smaller than the peaks that would be obtained if the spring were undamped. Away from the peaks the vibration isolation is 40 dB or more above 1 kHz. Because of its curved construction, the spring also provides reasonably good vibration isolation in the other two directions (L and T) even though it is made wide and thin to provide good thermal conductivity. These values are shown for a typical installation, as shown in FIG. 1, in FIG. 7.

Figure 8:
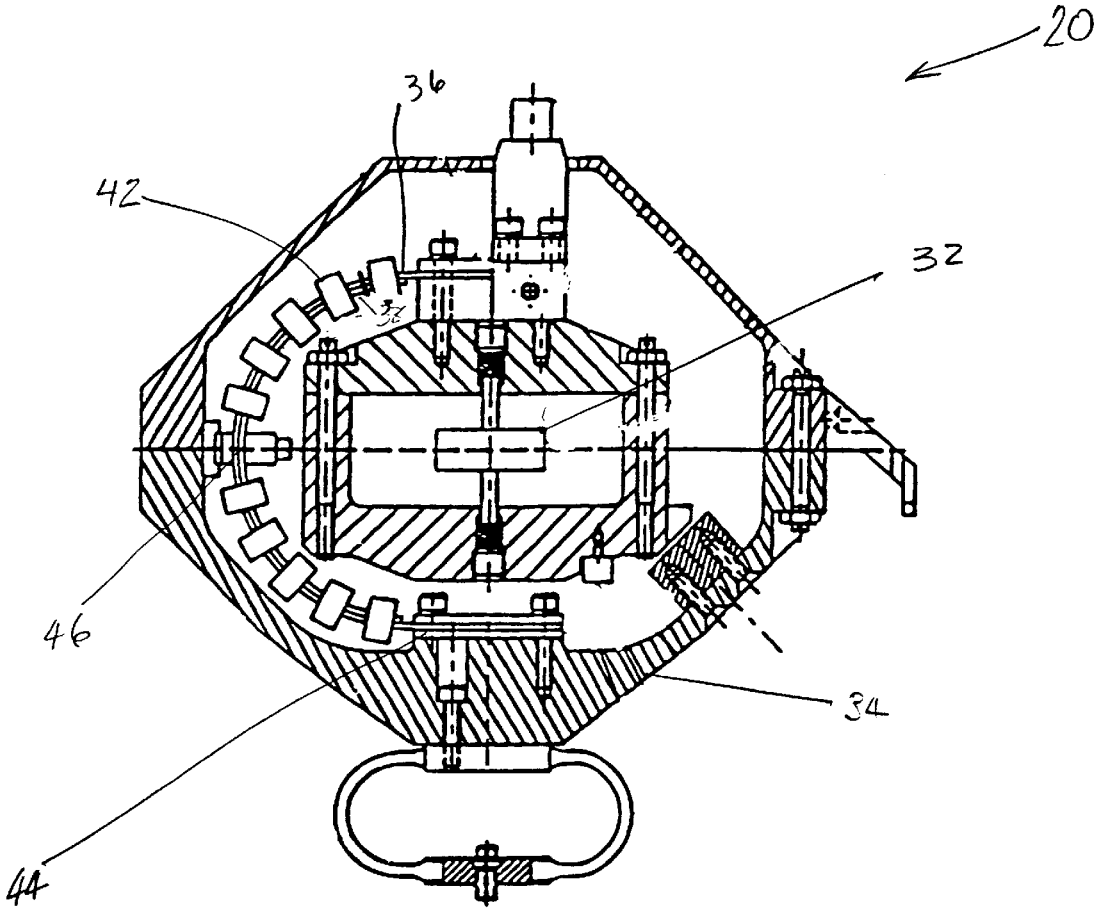
FIG. 8 shows a WGM-5 resonator, support spring, and radiation shield of a cryogenic subsystem.

A typical spring for use in a WGM-5 resonator 20, as shown in FIG. 8, supports the resonator 32 from a radiation shield 34 of the cryogenic subsystem. This support spring 36 is similar to the embodiment shown in FIG. 1 except that the spring 36 radius was increased so that the resonator 32 would nest within the spring 36 for compactness, and the thickness of the spring 36 and damper strap 38 were increased. The new proportions made the fundamental natural frequencies in the vertical, lengthwise, and transverse directions more equal. The damper clip 42 force was optimized experimentally to minimize the transmission peaks in the intermediate frequency range of main interest. The support spring 36 provides good thermal conductivity and good vibration isolation at most frequencies, but relatively poor vibration isolation at a few resonant frequencies. At those frequencies, the other vibration stages provide most of the isolation. If coincidences had occurred between the support spring 44 transmission peaks and the transmission peaks of the other vibration isolation stages, the support spring 36 resonances could have been changed easily by changing the masses of the present spring clamp bars 46 at the spring 36 mid-span.

Although this invention has been described in relation to an exemplary embodiment thereof, it will be understood by those skilled in the art that still other variations and modifications can be affected in the preferred embodiment without detracting from the scope and spirit of the invention as stated in the claims.

What is claimed:

1. A spring to support sapphire dielectric resonator operating from a cold finger at cryogenic temperatures comprising:

a support spring mounted between the cold finger and resonator;

a damper clamp mounted adjacent to said support spring not touching either the cold finger or the resonator;

a plurality of damper clips affixed around the support spring and said damper clamp pinching the support spring and damper clamp together; and said damper clips and said damper clamp cooperating so as to provide friction damping thereby preventing large vibration transmission peaks, hence reducing phase-noise vibration between the cold finger and resonator.

2. A method for reducing phase-noise vibration between a cold finger and a sapphire dielectric resonator operating at cryogenic temperatures comprising the steps of:

mounting a support spring between the cold finger and resonator;

mounting a damper clamp adjacent to said support spring not touching either the cold finger or the resonator;

affixing a plurality of damper clips around the support spring and said damper clamp pinching the support spring and damper clamp together; and said damper clips and said damper clamp cooperating so as to provide friction damping thereby preventing large vibration transmission peaks, hence reducing phase-noise vibration between the cold finger and resonator.

* * * * *